(12) United States Patent
Reed et al.

(10) Patent No.: US 7,174,347 B1
(45) Date of Patent: Feb. 6, 2007

(54) LOADING DATA USING LINKS IN A DATABASE

(75) Inventors: Michael L. Reed, San Diego, CA (US);
John D. Frazier, Ramona, CA (US);
Kevin D. Virgil, Oceanside, CA (US);
Andreas Marek, Encinitas, CA (US)

(73) Assignee: NCR Corp., Dayton, OH (US)

( * ) Notice: Subject to any disclaimer, the term of this patent is extended or adjusted under 35 U.S.C. 154(b) by 624 days.

(21) Appl. No.: 10/075,338

(22) Filed: Feb. 14, 2002

(51) Int. Cl.
*G06F 7/00* (2006.01)
*G06F 17/30* (2006.01)

(52) U.S. Cl. .................................. 707/104; 707/10

(58) Field of Classification Search .................. 707/10, 707/103, 8, 104
See application file for complete search history.

(56) References Cited

U.S. PATENT DOCUMENTS

| | | | | |
|---|---|---|---|---|
| 6,675,214 B2* | 1/2004 | Stewart et al. | ............. | 709/226 |
| 6,839,707 B2* | 1/2005 | Lee et al. | ..................... | 707/8 |
| 7,058,726 B1* | 6/2006 | Osaku et al. | ............... | 709/245 |
| 2003/0004975 A1* | 1/2003 | Nakano et al. | ............. | 707/200 |
| 2004/0158549 A1* | 8/2004 | Matena et al. | ................ | 707/1 |
| 2006/0004886 A1* | 1/2006 | Green et al. | ................ | 707/203 |

* cited by examiner

*Primary Examiner*—Don Wong
*Assistant Examiner*—Thanh-Ha Dang
(74) *Attorney, Agent, or Firm*—Frommer Lawrence Haug, LLP; John D. Cowart

(57) ABSTRACT

Methods and apparatus for loading data into a database system using links to data. In one implementation, a database system includes: one or more data storage facilities for use in storing data composing records in tables of a database; one or more processing modules configured to manage the data stored in the data-storage facilities; and a database management component configured to load data into the data storage facilities using one or more links received in a request from a client system, where each link indicates a server connection and a storage location for data corresponding to the link.

32 Claims, 4 Drawing Sheets

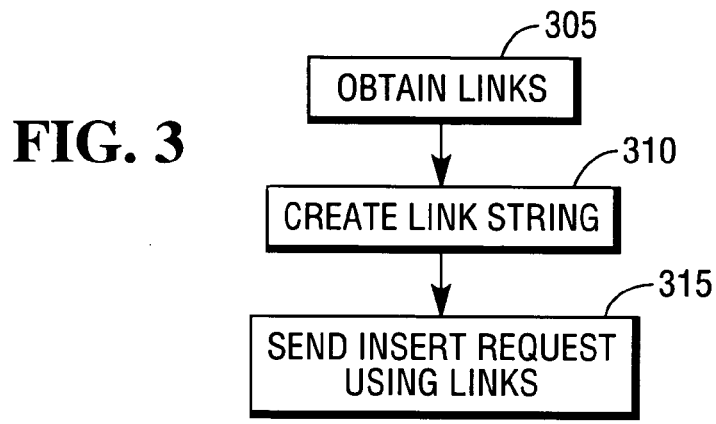
FIG. 3
FIG. 4
| Movie Table | | | |
|---|---|---|---|
| ID | Title | Rating | Media |
| 10111 | Database Down | 8 | <UDT OBJECT> |
| 20342 | My Object | 4 | <UDT OBJECT> |
| 45643 | Double Indirection | 9 | <UDT OBJECT> |
| | | | |
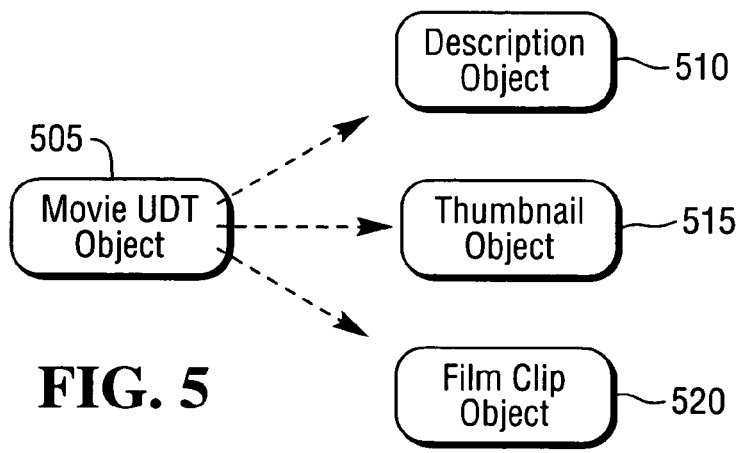
FIG. 5

LOADING DATA USING LINKS IN A DATABASE

BACKGROUND

In a typical database system supporting SQL (Structured Query Language), table rows can include one or more fields that are user defined type (UDT) fields. One type of UDT is a UDT structured type. The UDT structured type shares many properties in common with the C-language "struct." Both a C-language struct and a UDT structured type can be declared to be composed of any number of data members which can be either homogeneous or heterogeneous with respect to their data types. Both a C-language struct and a UDT structured type can also be nested, containing data members which are themselves structured types. The declaration of a UDT structured type is entered into the DBS system using SQL Data Definition Directives.

Typically, to load data into a UDT, the data is packed into a data structure, such as a BLOB (binary large object), and the packed data is uploaded to the database system. The database system then unpacks the data and distributes the data throughout the system.

SUMMARY

The present disclosure provides methods and apparatus for loading data into a database system using links to data. In one implementation, a database system includes: one or more data storage facilities for use in storing data composing records in tables of a database; one or more processing modules configured to manage the data stored in the data-storage facilities; and a database management component configured to load data into the data storage facilities using one or more links received in a request from a client system, where each link indicates a server connection and a storage location for data corresponding to the link.

In another implementation, a method of loading data into a database system includes: receiving an insert request to insert data into a table in a database system, where the insert request includes one or more links, and each link indicates a server connection and a storage location for data corresponding to the link; creating a table entry in the database system; opening the corresponding server connection for each received link; requesting the data corresponding to each received link through the corresponding opened server connection; receiving the requested data for each received link through the corresponding server connection; and storing the received data in the table entry.

In another implementation, a method of loading data into a database system includes: obtaining one or more links, where each link corresponds to a respective member of a field in an entry in a table in a database system and to data to be stored for the corresponding field, and each link indicates a server connection and a storage location for the corresponding data; and providing a request to the database system to load data into the table, where the request includes the obtained links.

BRIEF DESCRIPTION OF THE DRAWINGS

FIG. 3 is a flowchart of a client system loading data into a UDT object using a link constructor.

FIG. 4 shows a movie table stored in a database system.

FIG. 5 shows a representation of a movie UDT object.

DETAILED DESCRIPTION

Figure 1:
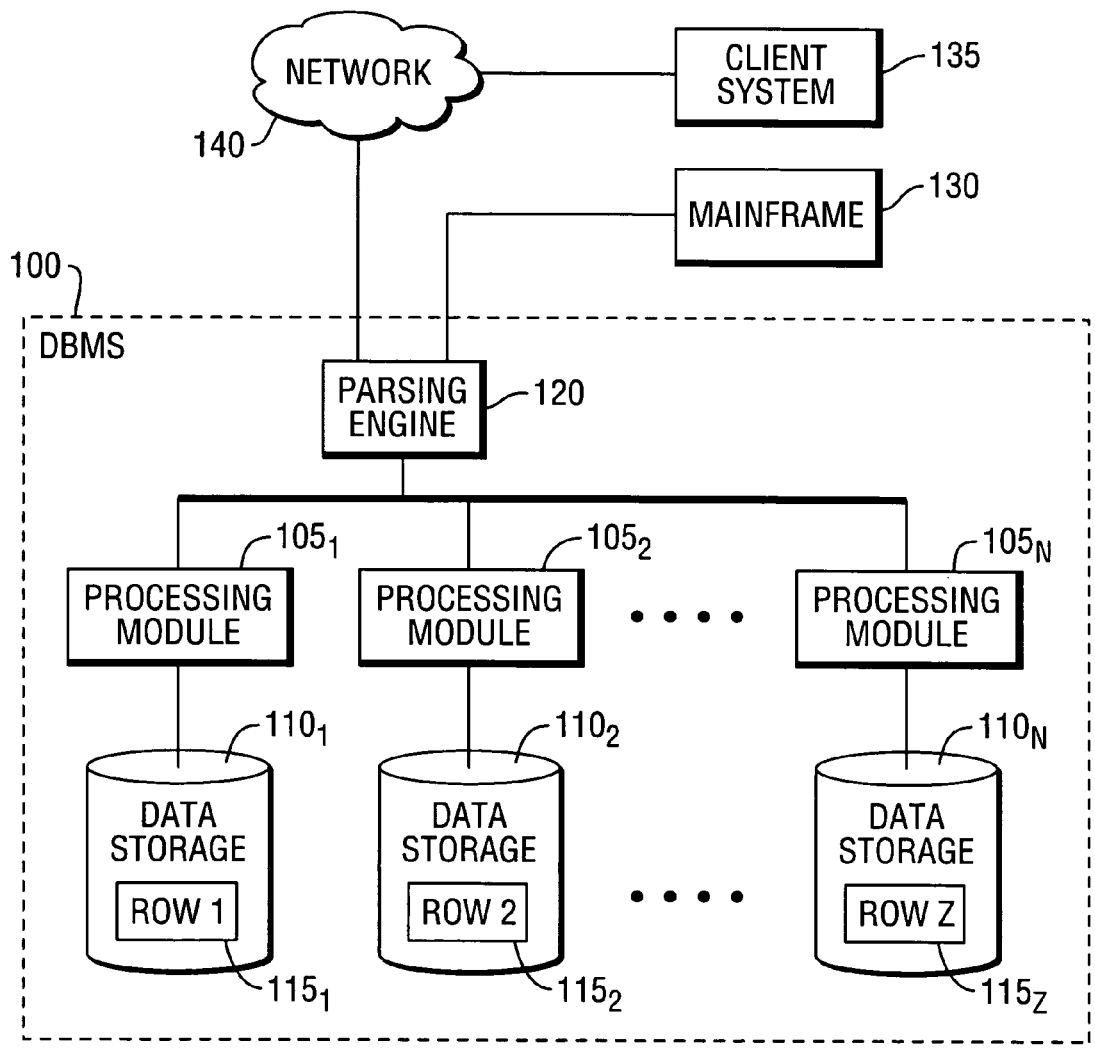
FIG. 1 shows a sample architecture of a database management system.

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_{1 \ldots N}$ that manage the storage and retrieval of data in corresponding data-storage facilities $110_{1 \ldots N}$. Each of processing modules $105_{1 \ldots N}$ manages a portion of a database that is stored in a corresponding one of data storage facilities $110_{1 \ldots N}$. Each of data storage facilities $110_{1 \ldots N}$ includes one or more storage devices, such as disk drives.

As described below, DBMS 100 stores and retrieves data for records or rows in tables of the database stored in data storage facilities $110_{1 \ldots N}$. Rows $115_{1 \ldots Z}$ of tables are stored across multiple data storage facilities $110_{1 \ldots N}$ to ensure that system workload is distributed evenly across processing modules $105_{1 \ldots N}$. A parsing engine 120 organizes the storage of data and the distribution of rows $115_{1 \ldots Z}$ among processing modules $105_{1 \ldots N}$ and data storage facilities $110_{1 \ldots N}$. In one implementation, parsing engine 120 forms a database management component for DBMS 100. Parsing engine 120 also coordinates the accessing and retrieval of data from data storage facilities $110_{1 \ldots N}$ in response to queries received from a user at a connected mainframe 130 or from a client computer 135 across a network 140. DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation.

SQL provides various defined types of data and methods for accessing and manipulating data. SQL also supports user defined types (UDT) and user defined methods (UDM). In one implementation, DBMS 100 supports SQL and includes support for UDT's and UDM's.

DBMS 100 uses constructor UDM's to create objects representing UDT fields in the database. The constructor UDM's also load data into the new objects. For a typical constructor, the constructor receives the data to be stored in the new object in the call to the constructor.

DBMS 100 also supports link constructors. A link constructor receives one or more links or data references to data to be stored in the new object. In one implementation, the links are URL's (uniform resource locators) indicating a resource stored on a network node connected to DBMS 100, such as across the Internet. In another implementation, the links are ODBC DSN's (Data Source Names). When called, the link constructor creates a new object and uses the received link or links to retrieve data to store in the new object.

In one implementation, DBMS 100 includes a table having a UDT field supported by a link constructor. The UDT field is a structured UDT and has one or more members. The UDT field in a table entry is represented by a UDT object and any appropriate subordinate objects for storing the data of the UDT field, such as one object for the UDT field and one object for each member of the UDT field. Client system 135 stores or has access to data to load into the UDT object (and any subordinate objects). In an alternative implementation, the UDT field is not a structured UDT and includes a single data type. In this case, loading data using a link constructor is similar to that described below for a structured UDT having a single member.

In one implementation, DBMS 100 supports preserving link data provided by the client system. The UDT object includes one or more members storing the link data, such as the link string supplied to the link constructor and/or the individual links parsed from the link string. Alternatively, DBMS 100 stores the link data separately from the UDT object. DBMS 100 also provides a UDM to retrieve the link data, such as in response to a request from the client system.

Figure 2:
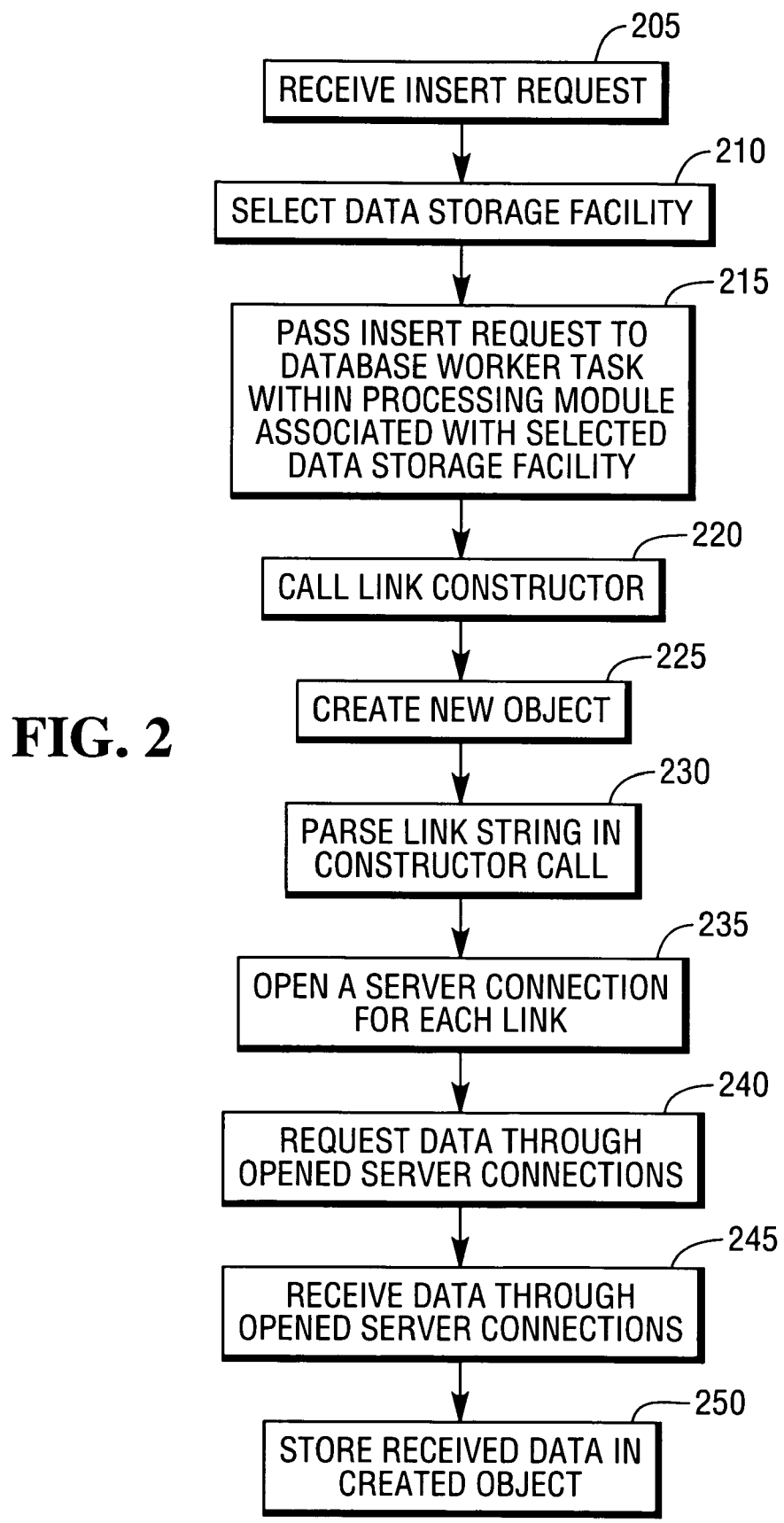
FIG. 2 is a flowchart of a database system loading data into a UDT object using a link constructor.

FIG. 2 is a flowchart of a database system, such as DBMS 100, loading data into a UDT object using a link constructor. DBMS 100 receives an insert request for the table, such as in an insert statement received at parsing engine 120 from a user at a client system 135, block 205. The insert request includes a link string indicating one or more links, such as URL's. Each link corresponds to a member of the UDT object. A link indicates a resource storing data to be loaded into the UDT object and a server connection to access that resource.

DBMS 100 selects which data storage facility $110_1 \ldots _N$ to store objects and data for the new table entry, block 210. As described above, data for a table is distributed throughout data storage facilities $110_1 \ldots _N$, though data for a single entry is stored within one data storage facility 110. DBMS 100 passes the insert request to a database worker task within the processing module 105 associated with the data storage facility 110 selected to store data for the new entry, block 215. As described below, the database worker task accesses and loads the data indicated by the links, reducing the workload on other parts of DBMS 100, such as parsing engine 120. By using database worker tasks within respective processing modules $105_1 \ldots _N$, DBMS 100 advantageously processes multiple inserts using link constructors in parallel. In an alternative implementation, DBMS 100 processes some or all insert requests including link strings centrally, such as in parsing engine 120.

The database worker task invokes the link constructor, including the link string in the link constructor call, block 220. The link constructor parses the link string to derive the included links from the link string, block 225. The link constructor creates a new UDT object and calls appropriate additional constructors to create any subordinate objects needed to represent members of the UDT object, block 230.

The link constructor opens a server connection for each received link, block 235. The link constructor requests data indicated by each link across the corresponding opened server connection, block 240. The link constructor then receives the requested data through the opened server connections, block 245. The link constructor performs any appropriate parsing or processing of the received data. The link constructor stores the received data for the created UDT object according to the members of the UDT, block 250. The link constructor stores the data in the object(s) for the row or stores some or all of the received data in a related large object storage database. To store the received data in subordinate objects, the link constructor calls the constructor for a subordinate object, passing the received data corresponding to the subordinate object in the constructor call. In one implementation, the link constructor initiates multiple threads, such as one for each link, to open the server connections, request data, and receive data.

FIG. 3 is a flowchart of a client system, such as client system 135, loading data into a UDT object using a link constructor. Client system 135 obtains one or more links corresponding to the data to load into the UDT object, block 305. As described above, each link corresponds to a member of the UDT object. Each link points to data to be loaded into the UDT object and indicates a server connection to access that resource. Client system 135 creates a link string including the obtained links, block 310. In one implementation, client system 135 converts each obtained link into a string and combines the strings to form the link string. Client system 135 sends an insert request to DBMS 100 including the link string, block 315. Where client system 135 is designed to use a parallel database, client system 135 can submit multiple insert requests to be processed by DBMS 100 in parallel.

Figure 6:
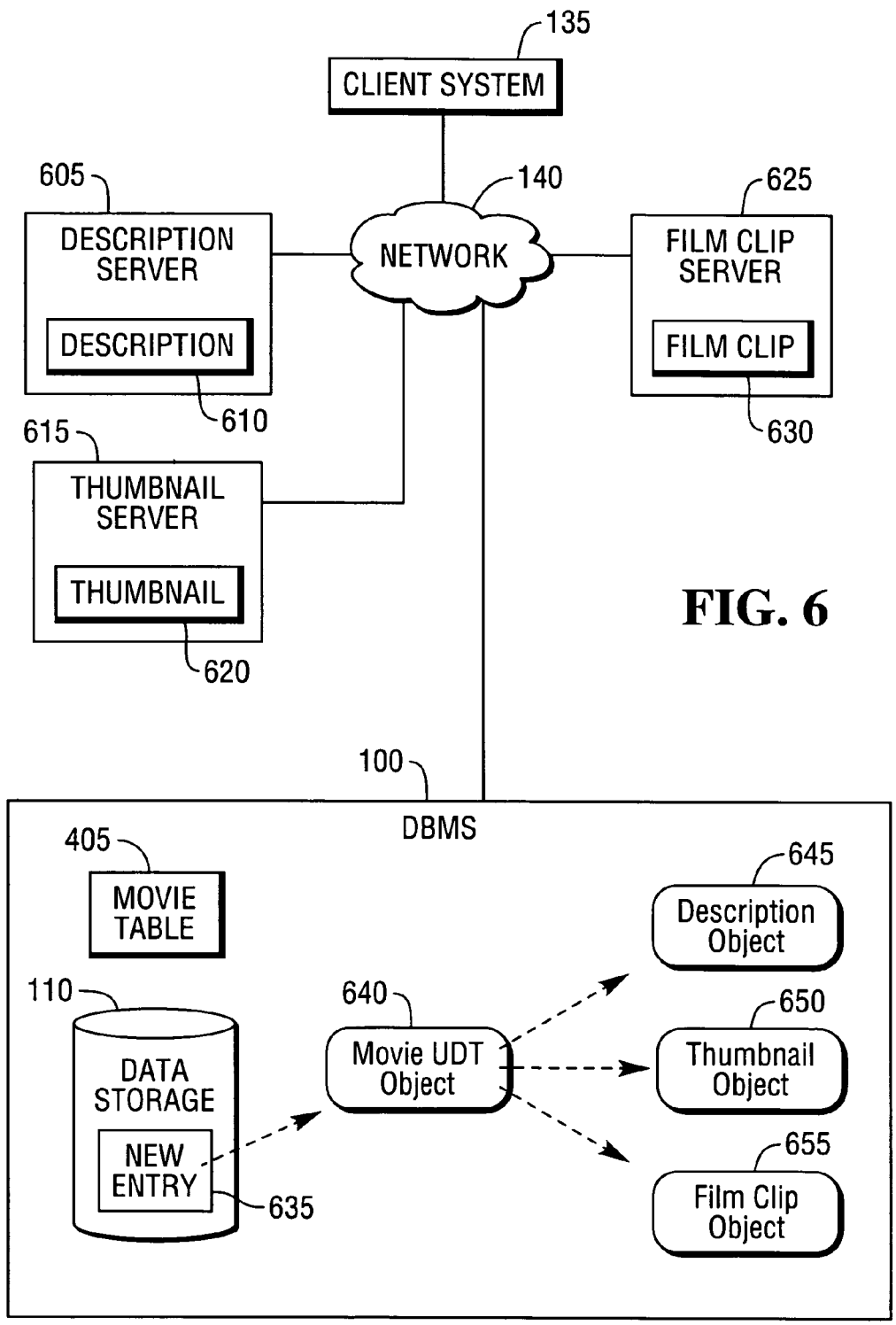
FIG. 6 shows a representation of resources storing media data to be stored in an entry in a movie table.

FIGS. 4 through 6 illustrate an example of using UDT's supporting link constructors within DBMS 100. FIG. 4 shows a movie table 405 stored in DBMS 100. Each entry or row stores data about a movie. Movie table 405 has four fields: ID, Title, Rating, and Media. The ID field is an integer field for storing a database identifier for a movie. The Title field is a string or character field for storing the movie title. The Rating field is an integer field for storing a rating score the movie received. The Media field is a UDT field for storing a movie UDT object. The following code requests a new table including a field of type MovieUDT:

CREATE TABLE movies (ID Integer, Title Char (30), Rating Integer, Media MovieUDT);

FIG. 5 shows a representation of a movie UDT object 505. Movie UDT object 505 stores media data about a movie. Movie UDT object 505 has three members: description, thumbnail, and film clip. In this example, each member is represented by a respective subordinate object: description object 510, thumbnail object 515, and film clip object 520. Description member 510 stores a string. Thumbnail object 515 stores an image, such as a JPEG file. Film clip object 520 stores a video sequence, such as an MPEG file. Movie UDT object 505 stores a pointer to each of subordinate objects 510, 515, 520, represented by dashed arrows in FIG. 5. In an alternative implementation, data for one or more of objects 510, 515, 520 is stored within movie UDT object 505 instead of the subordinate object. In another alternative implementation, data for one or more of subordinate objects 510, 515, 520 is stored in a related large object database and movie UDT object 505 or the subordinate object stores a reference to the data, such as an identifier.

FIG. 6 shows a representation of resources storing media data to be stored in an entry in movie table 405. A description server 605 stores a description 610. Description 610 is a string. A thumbnail server 615 stores a thumbnail 620. Thumbnail 620 is a JPEG file. A film clip server 625 stores a film clip 630. Film clip 630 is an MPEG file. Client system 135, DBMS 100, description server 605, thumbnail server 615, and film clip server 625 are interconnected through network 140 (e.g., the Internet). DBMS 100 stores data representing movie table 405.

To load description 610, thumbnail 620, and film clip 630 into movie table 405, client system 135 and DBMS 100 use links to the data and a link constructor, as described above referring to FIGS. 4 and 5. Client system 135 obtains links to each of description 610, thumbnail 620, and film clip 630. In this example, the description link to description 610 is the URL "http://www.descriptionserver.com/description". The thumbnail link to thumbnail 620 is the URL "http://www.thumbnailserver.com/thumbnail". The film clip link to film clip 630 is the URL "http://www.filmclipserver.com/filmclip". Client system 135 builds a link string by combining the description link, the thumbnail link, and the film clip link. The resulting link string is "http://www.descriptionserver.com/description, http://www.thumbnailserver.com/ thumbnail, http://www.filmclipserver.com/filmclip". Client system 135 sends an insert request to DBMS 100 to create a new entry 635 in movie table 405. The insert request includes data for each of the fields of new entry 635 (ID, Title, Rating, Media). The data for the Media field is the link string. Using an SQL statement to insert data for a movie "Defragged", client system 135 sends this statement:

INSERT INTO MOVIE_TABLE USING VALUES (54763, "Defragged", 6, new MovieUDT ("http://www. descriptionserver.com/description, http://www.thumbnailserver.com/thumbnail, http://www.filmclipserver.com /filmclip"))

In response to this insert request, DBMS 100 calls appropriate constructors to create new entry 635. For the Media field, DBMS 100 selects a data storage facility 110 (as described above, DBMS 100 includes multiple data storage facilities $110_1 \ldots _N$) and passes the insert request, including the link string, to a database worker task within the processing module 105 associated with the selected data storage facility 110. The database worker task calls a link constructor corresponding to the movie UDT to create a new movie UDT object 640. The database worker task includes the link string in the link constructor call. The link constructor parses the link string to separate each of the links out of the link string. The link constructor creates movie UDT object 640, initially blank. The description link indicates description 610 is stored on description server 605 so the link constructor opens a connection to description server 605 through network 140. The link constructor requests the data for description 610 from description server 605. Description server 605 sends data for description 610 to DBMS 100 through the open connection. The link constructor receives the data for description 610. The link constructor creates description object 645 as a new subordinate object and stores the data for description 610 in description object 645. The link constructor sets movie UDT object 640 to point to description object 645. A similar process is followed for loading data for thumbnail 620 into a thumbnail object 650, and loading data for film clip 630 into a film clip object 655. As described above, in one implementation, DBMS 100 initiates separate threads for each received link to create subordinate objects and download data into the objects using the received links.

In another implementation, DBMS 100 supports link loader UDM's. A link loader UDM is similar to a link constructor but loads data into existing objects, rather than creating new objects. For example, DBMS 100 calls a link loader in response to receiving an update request including a link string. Similar to a link constructor, DBMS 100 loads data indicated by the link(s) in the link string and stores the data in the object(s) indicated by the update request.

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules $105_1 \ldots _N$, data storage facilities $110_1 \ldots _N$, and parsing engine 120. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

What is claimed is:

1. A method of loading data into a database system, comprising:
    receiving an insert request to insert data into a table in a database system, where the insert request includes one or more links, and each link indicates a server connection and a storage location for data corresponding to the link;
    creating a table entry in the database system;
    opening the corresponding server connection for each received link;
    requesting the data corresponding to each received link through the corresponding opened server connection;
    receiving the requested data for each received link through the corresponding server connection; and
    storing the received data in the table entry;
    where at least two insert requests are processed in parallel.

2. The method of claim 1, comprising:
    selecting a data storage facility within the database system to store the data indicated by the insert request; and
    passing the insert request to a database worker task within a processing module associated with the selected data storage facility.

3. The method of claim 1, where the table entry includes a field of a user defined type and the received data is stored in a user defined type object representing the user defined type field.

4. The method of claim 1, where at least one link is a URL.

5. The method of claim 1, where at least one link is an ODBC DSN.

6. The method of claim 1, where the insert request includes a link string indicating the one or more links.

7. The method of claim 6, further comprising parsing the link string to derive each of the links.

8. The method of claim 1, where opening the corresponding server connection includes opening a connection across the Internet.

9. The method of claim 1, further comprising storing at least some of the received data in a large object database related to the database system.

10. The method of claim 1, further comprising passing the received links to a link constructor.

11. The method of claim 10, where the link constructor creates the table entry, opens appropriate server connections, requests and receives data through opened server connections, and stores the received data in the created table entry.

12. A computer program, stored on a computer-readable storage medium, for use in loading data into a database system, the program comprising executable instructions that cause a computer to:
- receive an insert request to insert data into a table in a database system, where the insert request includes one or more links, and each link indicates a server connection and a storage location for data corresponding to the link;
- create a table entry in the database system;
- open the corresponding server connection for each received link;
- request the data corresponding to each received link through the corresponding opened server connection;
- receive the requested data for each received link through the corresponding server connection; and
- store the received data in the table entry;
- where at least two insert requests are processed in parallel.

13. The computer program of claim 12, further comprising executable instructions that cause a computer to:
- select a data storage facility within the database system to store the data indicated by the insert request; and
- pass the insert request to a database worker task within a processing module associated with the selected data storage facility.

14. The computer program of claim 12, where the table entry includes a field of a user defined type and the received data is stored in a user defined type object representing the user defined type field.

15. The computer program of claim 12, where at least one link is a URL.

16. The computer program of claim 12, where at least one link is an ODBC DSN.

17. The computer program of claim 12, where the insert request includes a link string indicating the one or more links.

18. The computer program of claim 17, further comprising executable instructions that cause a computer to parse the link string to derive each of the links.

19. The computer program of claim 12, where opening the corresponding server connection includes opening a connection across the Internet.

20. The computer program of claim 12, further comprising executable instructions that cause a computer to store at least some of the received data in a large object database related to the database system.

21. The computer program of claim 12, further comprising executable instructions that cause a computer to pass the received links to a link constructor.

22. The computer program of claim 21, where the link constructor creates the table entry, opens appropriate server connections, requests and receives data through opened server connections, and stores the received data in the created table entry.

23. A database system, comprising:
- one or more data storage facilities for use in storing data composing records in tables of a database;
- one or more processing modules configured to manage the data stored in the data-storage facilities; and
- a database management component configured to load data into the data storage facilities after receiving one or more links in a request from a client system, where each link indicates a server connection and a storage location for the data to be loaded;
- where at least one processing module includes executable instructions providing a database worker task configured to:
  - create a table entry in a data storage facility corresponding to the processing module including the database worker task;
  - open the corresponding server connection for each received link;
  - request the data corresponding to each received link through the corresponding opened server connection;
  - receive the requested data for each received link through the corresponding server connection; and
  - store the received data in the table entry; and
- where the database management component is further configured to process at least two client requests including link strings in parallel.

24. The database system of claim 23, where the request is an insert request.

25. The database system of claim 23, where the request is an update request.

26. The database system of claim 23, where the one or more data storage facilities store one or more objects of a user defined type for storing data loaded using links received in client requests.

27. The database system of claim 23, where the database management component is further configured to:
- select a data storage facility within the database system to store the data indicated by the client request; and
- pass the client request to the database worker task within a processing module associated with the selected data storage facility.

28. The database system of claim 23, where at least one link is a URL.

29. The database system of claim 23, where at least one link is an ODBC DSN.

30. The database system of claim 23, where at least one link indicates a server connection accessible to the database management component through the Internet.

31. The database system of claim 23, further comprising a large object database connected to the database management component.

32. The database system of claim 23, where the database management component is further configured to store the received links and provide the stored links upon request.

* * * * *